(12) United States Patent
Amini et al.

(10) Patent No.: US 10,036,402 B2
(45) Date of Patent: Jul. 31, 2018

(54) MAX PHASE REINFORCED POLYMER MATRIX COMPOSITE ABRADABLES WITH ENHANCED THERMAL CONDUCTIVITY

(71) Applicant: UNITED TECHNOLOGiES CORPORATION, Hartford, CT (US)

(72) Inventors: Shahram Amini, Glastonbury, CT (US); Christopher W Strock, Kennebunk, ME (US); Changsheng Guo, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 155 days.

(21) Appl. No.: 14/709,721

(22) Filed: May 12, 2015

(65) Prior Publication Data

US 2016/0327059 A1   Nov. 10, 2016

Related U.S. Application Data

(60) Provisional application No. 61/993,033, filed on May 14, 2014.

(51) Int. Cl.
| | |
|---|---|
| *F01D 11/12* | (2006.01) |
| *F04D 29/52* | (2006.01) |
| *F01D 5/28* | (2006.01) |
| *F01D 21/04* | (2006.01) |
| *F02K 3/06* | (2006.01) |
| *F04D 19/00* | (2006.01) |
| *F04D 29/02* | (2006.01) |
| *F04D 29/16* | (2006.01) |

(52) U.S. Cl.
CPC ............. *F04D 29/526* (2013.01); *F01D 5/28* (2013.01); *F01D 11/12* (2013.01); *F01D 11/122* (2013.01); *F01D 21/045* (2013.01); *F02K 3/06* (2013.01); *F04D 19/002* (2013.01); *F04D 29/023* (2013.01); *F04D 29/164* (2013.01); *F05B 2220/302* (2013.01); *F05B 2230/90* (2013.01); *F05B 2280/107* (2013.01); *F05B 2280/40* (2013.01); *F05B 2280/5011* (2013.01); *Y02T 50/672* (2013.01); *Y02T 50/673* (2013.01)

(58) Field of Classification Search
CPC ... F01D 11/122; F01D 11/125; F05B 2230/90
See application file for complete search history.

(56) References Cited

U.S. PATENT DOCUMENTS

| | | | |
|---|---|---|---|
| 4,423,097 A * | 12/1983 | Mons | ...................... C22C 32/00 277/415 |
| 6,231,969 B1 | 5/2001 | Knight et al. | |
| 6,497,922 B2 | 12/2002 | Knight et al. | |
| 7,553,564 B2 | 6/2009 | Gupta et al. | |

(Continued)

FOREIGN PATENT DOCUMENTS

EP   2196632 A2   6/2010

*Primary Examiner* — Logan Kraft
*Assistant Examiner* — Sabbir Hasan
(74) *Attorney, Agent, or Firm* — Bachman & LaPointe, P.C.

(57) ABSTRACT

A turbine engine system comprising a turbine engine component, such as a fan includes a fan casing and a fan blade rotatable within the fan casing. An abradable seal coupled to the fan casing proximate the fan blade. The abradable seal comprising an abradable composite layer including a MAX phase solid and a polymer based abradable composition.

15 Claims, 2 Drawing Sheets

(56) References Cited

U.S. PATENT DOCUMENTS

| | | |
|---|---|---|
| 7,572,313 B2 | 8/2009 | Palanisamy et al. |
| 8,017,240 B2 * | 9/2011 | Strock ................... C23C 4/02 |
| | | 427/154 |
| 8,650,753 B2 | 2/2014 | Sellars et al. |
| 2008/0013168 A1 | 6/2008 | Strock |
| 2008/0131686 A1 | 6/2008 | Strock |
| 2010/0055492 A1 * | 3/2010 | Barsoum ................ B22D 19/02 |
| | | 428/613 |
| 2013/0042475 A1 | 2/2013 | Schulte et al. |
| 2014/0044951 A1 | 2/2014 | Beals et al. |

* cited by examiner

MAX PHASE REINFORCED POLYMER MATRIX COMPOSITE ABRADABLES WITH ENHANCED THERMAL CONDUCTIVITY

CROSS REFERENCE TO RELATED APPLICATION

This application claims the benefit of provisional application Ser. No 61/993,033, filed May 14, 2014.

BACKGROUND

The present disclosure is directed to the use of MAX phase solids mixed with polymers to form an outer air seal of a turbine engine, for enhanced thermal conductivity and improved abradability to protect the blade tips from overheating.

Fan blade technology uses abradable coatings for fuel burn reduction and increases in temperature capability. In some fans, a coating is applied to the airfoil portion of the fan. Abradable systems can be susceptible to efficiency losses and premature failure due to high rub forces, rough coating surfaces, local heat generation, high coating temperature, coating spallation, and durability issues in certain environments. There are several requirements to mitigate issues associated with abradable coatings, such as improved abradable damage tolerance and toughness, improved thermal cycling and durability, and reduced frictional forces and low coefficient of friction, self-lubrication and low energy of cut, high abradable thermal conductivity and higher erosion resistance and desired wear ratio.

The abradable seal is typically positioned between a stationary component on the opposite side of a rotating component. For example, the stationary component may be an outer engine casing or a shroud and the rotating component may be a blade tip, a sealing ring, a knife-edge seal, and the like. In operation, the blade initially engages the abradable seal and rubs or cuts into the abradable seal. The abradable seal helps ensure that the blade tip does not contact the outer casing, it is the abradable material of the seal that is removed, rather than the blade tip. The abradable seal prevents damage to components of gas turbine engines during rubs thus allows operation at reduced clearances between the stationary component and the rotating component. Minimizing clearance between the abradable seal and the rotating component also reduces leakage over the blade tip, resulting in increased efficiency and power output.

Current aluminum fan blades are polyurethane coated to enhance erosion resistance. The aluminum blade tips rub against polymer based abradable outer air seal coatings. The heat generated by friction during a rub event conducts into the airfoil introducing a temperature rise which in turn may result in the polyurethane coating blistering. High surface temperatures and heating of the blades occur due to low thermal conductivity of the polymer based abradable outer air seal coating. There is a need for improved capability and increased thermal conductivity of abradable outer air seal coatings in order to mitigate temperature rise in such airfoils during rub events and prevent spallation and blistering of polyurethane coatings from the blades.

SUMMARY

In accordance with the present disclosure, there is provided a turbine engine system comprising a turbine engine fan section. The fan section including a fan casing and a fan blade rotatable within the fan casing. An abradable seal is coupled to the fan casing between the fan casing and the fan blade. The abradable seal comprises an abradable composite layer including MAX phase solids and a polymer based abradable composition.

In an exemplary embodiment the MAX phase solids include a composite having MAX phases and a metal matrix. The metal matrix is at least one of a low, medium, and high melting point metal or metal alloy.

In an exemplary embodiment the MAX phase solids are defined by the formula $M_{n+1}AX_n$ where M is an early transition metal element, A is an A-group element, X is C or N, and n=1 to 3.

In an exemplary embodiment a coating layer deposited between the fan casing and the abradable seal.

In an exemplary embodiment the abradable composite layer includes the MAX phase solids from about 1% to about 66% by volume and the polymer based abradable composition being the remainder.

In an exemplary embodiment the abradable composite layer includes the MAX phase solids and the polymer based abradable material and a hollow micro sphere material.

In another exemplary embodiment a turbine engine abradable outer air seal comprises a casing substrate. An abradable composite layer is coupled to the substrate and the abradable composite layer comprises MAX phase solids and a polymer based abradable composition.

In an exemplary embodiment the turbine engine abradable outer air seal comprises a fan abradable outer air seal.

In an exemplary embodiment the abradable composite layer includes the MAX phase solids of between about 1 wt. % and about 10 wt. % and the polymer based abradable composition being from about 90 wt. % to about 99 wt. %

In an exemplary embodiment a bond coat is coupled between the substrate and the abradable composite layer.

In another exemplary embodiment a process for manufacturing a turbine engine abradable outer air seal component comprises the steps of combining MAX phase solids and a polymer based abradable material into an abradable composition. The process includes applying the abradable composition to a fan casing substrate in the form of an outer air seal.

In an exemplary embodiment the combining step comprises mixing the MAX phase solids of between about 1 wt. % and about 10 wt. % and the polymer based abradable material from about 90 wt. % to about 99 wt. % into the abradable composition.

In an exemplary embodiment further comprises coupling a bond coating to the substrate between the substrate and the abradable composition.

In an exemplary embodiment the process includes combining a filler with the MAX phase solids and the polymer based abradable material into the abradable composition.

The disclosure includes the use of MAX phases into silicone rubber abradable or other polymer-based compositions. Incorporation of the MAX phases with high metallic-like thermal conductivity will enhance thermal conductivity of the abradable seal coatings.

The disclosure provides for increased thermal conductivity of abradable outer air seal coatings and has the potential to mitigate temperature rise in the aluminum airfoils during rub events and prevent spallation and blistering of polyurethane coatings from the current fan blade aluminum material.

Other details of the MAX phase composites for turbine engine component fan air seals are set forth in the following detailed description and the accompanying drawing wherein like reference numerals depict like elements.

DETAILED DESCRIPTION

Figure 1:
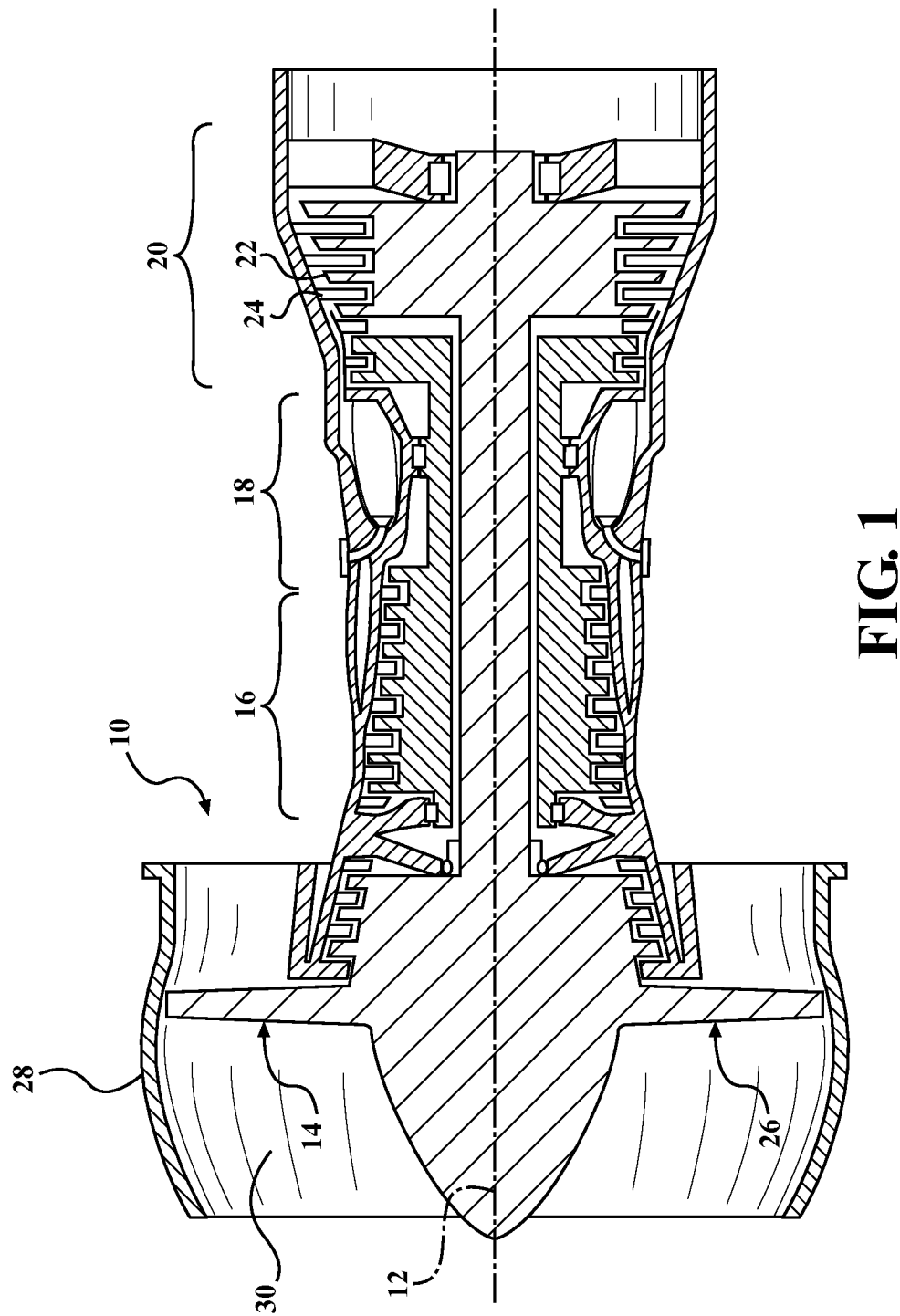
FIG. 1 is a schematic representation of an exemplary turbine engine.

Referring now to FIG. 1 illustrates selected portions of an exemplary gas turbine engine 10, such as a gas turbine engine 10 used for propulsion. In this example, the gas turbine engine 10 is circumferentially disposed about an engine centerline 12. The engine 10 may include a fan 14, a compressor 16, a combustion section 18, and a turbine section 20 that includes rotating turbine blades 22 and static turbine vanes 24. The fan 14 can include a fan blade 26 that rotates within the fan casing 28. A fan air flow 30 passes through the fan casing 28 over the fan blade(s) 26. It is to be understood that other types of engines may also benefit from the examples disclosed herein, such as engines that include multiple fan sections or engines having other types of compressors, combustors, and turbines.

Figure 2:
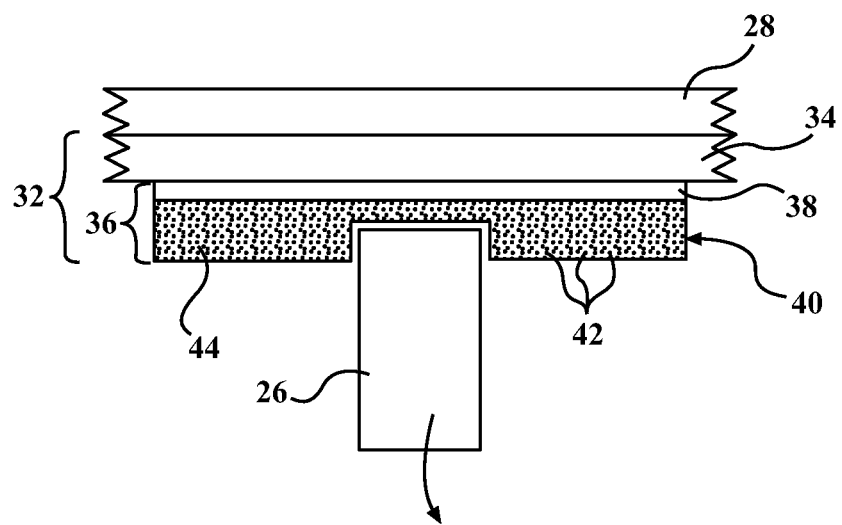
FIG. 2 is a side view of an abradable seal positioned proximate a fan blade.

FIG. 2 shows a side view of an abradable seal 32 positioned proximate fan blade 26 of a gas turbine engine. The abradable seal 32 improves the efficiency of the gas turbine engine by increasing the aerodynamic efficiency and stability of the gas turbine engine. This is accomplished in part by using a more thermally stable coating material. In addition, the abradable seal 32 has low interaction energy when abraded. The abradability of a material may be measured by the amount of energy required for the fan blade 26 to wear down the abradable seal 32. The abradable seal 32 also reduces damage to the fan blade 26 as well as components located downstream due to its brittle fracture mode below temperatures of approximately 1200 degrees Centigrade by turning to dust.

The abradable seal 32 includes a substrate 34 proximate the fan casing 28 and a coating 36. The substrate 34 provides a base for the coating 36, which faces the fan blade 26. In an exemplary embodiment, the substrate 34 may be formed of metal, ceramic, or composite material. The coating 36 may be a two layer system with a bond coat 38 and an abradable composite layer 40. The abradable composite layer 40 is formed by a MAX phase solid reinforcement 42 and a silicone rubber or other polymer-based composition matrix material 44. The bond coat 38 is used when additional adhesion is needed between the substrate 34 and the abradable composite layer 40.

The abradable composite layer 40 of coating 36 may be applied as a dense single phase layer, a porous single phase layer, or a composite on substrate 34 and bond coat 38. MAX phase solids 42 have a layered structure at an atomic scale, and exhibits both metallic and ceramic properties, making it both durable and abradable.

Examples of suitable MAX phase solids include, but are not limited to: $Ti_2AlC$ and/or $Ti_3SiC_2$. The MAX phase solid is a high modulus and high damage tolerant material. The MAX phase solid may be in the form of a powder or particles having a crystalline nanolaminated structure. The MAX phase solid typically has the formula $M_{n+1}AX_n$, where M is a transition metal, A is an A-group element, X is carbon (C), nitrogen (N) or both, and n=1-3.

Examples of particularly suitable materials include, but are not limited to: $M_{n+1}AX_n$ where M is an early transition metal element, A is an A-group element, X is C or N, and n=1 to 3. Numerous MAX phase solids are disclosed and described in detail in "Microstructure and mechanical properties of porous $Ti_3SiC_2$", published online on Jul. 14, 2005, by Z. M. Sun, A. Murugaiah, T. Zhen, A. Zhou, and M. W. Barsoum; "Mechanical Properties of MAX Phases" published in 2004 by Encyclopedia of Materials Science and Technology, Eds. by Buschow, Cahn, Flemings, Kramer, Mahajan, and Veyssiere, Elsevier Science; and "The MAX Phases: Unique New Carbide and Nitride Materials", published in July-August 2001, by Michel W. Barsoum and Tamer El-Raghy, and are incorporated by reference herein.

The atomic layers within the MAX phase solids 42 are layers of hard, strong, high modulus carbides and nitrides. The atoms are also arranged in layers so that they form very weak crystallographic planes. Thus, both high modulus strong planes and very weak planes are present in the MAX phase solids 42. This results in kink band forming tendencies, which gives it both ceramic and metallic properties. When MAX phase solids 42 deform, there is slip between the atomic planes of the molecules, forming kink bands. The MAX phases provide toughness similar to a metal, making the composite material capable of withstanding damage while the high modulus and high hardness of the MAX phases make the composite capable of withstanding fine particle erosion. At the same time, the slip planes have low strength such that the MAX phase solid particles are machinable using a sharp cutting point or abrasive.

The MAX phase solids 42 are dispersed within a polymer matrix to form a composite material. The matrix may be any polymer suitable for use in the intended environment. Suitable polymers include polyester, epoxy, polyimide, polyurethane and silicone among others. It is desirable that the polymer is a thermoset or cross linked polymer so that wear debris from rub is liberated in the form of dust. Thermoplastics may be undesirable due to their tendency to soften and form undesirable buildup on mating components.

In addition to the primary constituents of Max phase particles and polymer matrix, it may be desirable to add a low density filler to reduce the density of an abradable seal. The ratio of MAX to polymer matrix can remain constant in an exemplary embodiment. The MAX phase solids and polymer matrix mixture can be diluted with the filler in an exemplary embodiment. Fillers particularly well suited for this application are glass and polymer micro-balloons. Considerations for their selection include operating temperature, permitted heat load into the blade and desired abradable bulk properties. Glass micro-balloons will result in higher bulk modulus of the abradable and higher heat generation during rub than polymer micro-balloons. An exemplary glass micro-balloon can include Sphericel® glass micro spheres of 39 micron mean size and density of 0.34 g/cc, produced by Potters Industries, LLC of Valley Forge, Pa. An exemplary polymer micro-balloons can include DUALITE® E065-135D 0.065 g/cc with a 135 micron mean particle size from Henkle of Greenville, S.C.

In an exemplary embodiment, the MAX phase solids reinforcement 42 preferably constitutes between approximately 1% and approximately 66% of the abradable composite layer 40 by volume. The polymer matrix material 44 constitutes between approximately 34% and approximately 99% by volume of the abradable composite layer 40. A composition particularly well suited for fan application is 75 volume % epoxy with 25 volume % of 3 micron $Ti_2AlC$ MAX phase. The density of this mixture is then reduced by mixing at 50 volume % with DUALITE® E065-135D polymer hollow micro spheres.

The abradable composite layer 40 of abradable seal 32 may be applied to substrate 34 and bond coat 38 by any suitable method known in the art. Examples of suitable methods include injection molding, spraying, manual application with a trowel and adhesive bonding of a composite preform. In an exemplary embodiment, abradable composite layer 40 is applied onto bond coat 38 of MAX phase reinforcement material 42 and polymer based abradable material 44 to a thickness of between approximately 1 millimeter and approximately 10 millimeters. In an exemplary embodiment, reinforcement material 42 is applied to bond coat 38 by spraying. In another exemplary embodiment, MAX phase reinforcement material 42 and rubber abradable material 44 are blended to create a mixture that is fed through a single port of an applicator device. In another exemplary embodiment, composite powder particles containing both MAX phase reinforcement material 42 and rubber abradable material 44 make up the feedstock.

Due to its metallic characteristics, such as toughness and ductility, abradable seal 32 may be placed in harsh environments without eroding. In an exemplary embodiment, the abradable seal composite layer 40 is positioned on substrate 34, proximate fan casing 28, of a gas turbine engine proximate the fan blade 26 tips. The abradable seal 32 is positioned between the fan casing 28 and the rotating fan blade 26 tips and functions to help control the clearance between fan casing 28 and fan blade 26. The fan casing 28 may serve directly as substrate 34 for coating 36, and thus be an integral part of the abradable seal 32. The fan casing 28 and abradable seal 32 are stationary relative to the engine with moving blades 26. The fan blade 26 tips operate with a small clearance to the abradable blade outer air seal surface, and typically do not come into direct contact with abradable seal 32. However, due to thermal events such as expansion or contraction, or changing loads such as g-loads or maneuver loads, the position of fan casing 28 can occasionally shift relative to the fan blade tips.

While the abradable seal 32 exhibits desirable metallic/rubber characteristics, abradable seal 32 also exhibits desirable ceramic characteristics. Thus, when fan blade 26 tips do contact the abradable seal 32, damage to the fan blade 26 tips are either minimized or prevented. Because matrix material 42 has brittle, ceramic properties, coating 36 is easily abraded from substrate 34, allowing fan blade 26 tips to contact with the abradable seal 32 without damaging the fan blade 26 tips. This is beneficial because repairing or replacing fan blades is more costly and time-consuming than replacing the abradable seal 32. In addition, damage to the blade tips and casing are prevented by the low rub forces, low heat generation, and lack of coating smearing and galling. Due to the MAX phase solids reinforcement material 42 excellent thermal conduction properties, the abradable seal 32 has superior heat transfer properties. Thus, the thermal energy dissipation can allow for lower temperatures at the abradable seal 32 and the fan 26. The polymer coatings on the fan blade 26 are protected from excessive heat and the resultant thermal damage caused by the excessive heat of the fan blade 26.

The abradable seal is positioned in a gas turbine engine proximate the fan blade and includes a substrate and a coating composite applied on a top surface of the substrate. By using the MAX phase solids reinforcement material with the polymer based abradable material rather than completely being composed of polymer based material, the thermal conductivity of the abradable seal is increased. This is due to the low high thermal conductivity of the MAX phase solids. Approximately 1-10 wt. % MAX phase ternary carbide and/or nitride is blended into silicone rubber abradable or other polymer-based compositions in order to enhance thermal conductivity. The high thermal conductivity of MAX phase particles (at ~40 W/m-K) will provide increase in thermal conductivity of the abradable coatings even at low concentrations. The MAX phases also offer ultrahigh damping capability combined with excellent mechanical properties, improved toughness, high damage tolerance, high thermal stability, and superb machinability, among others. Therefore, the MAX phases will also reinforce the polymer based materials and significantly increase damping capacity of the rubber or polymers used in the abradable coatings.

Additional benefits are provided by blending MAX phase ternary carbide and/or nitride into silicone rubber abradable or other polymer-based compositions. The rub temperature and blade tip temperature will be lower due to the increased thermal conductivity of the enhanced abradable material. The lower temperatures will help to prevent damage to the polyurethane erosion resistant coating on the aluminum airfoils of the fan blades. The durability of the outer air seal abradable coatings will be increased due to the significant toughening characteristics of the MAX phase ternary carbides and nitrides. The rubbed surface finish shall be improved with the addition of MAX phases due to the increased stiffness and damping capability of the composite outer air seal. The layered structure of the MAX phase itself will allow the seal to wear away during rub interaction more readily than other hard phase fillers like glass micro balloons despite the high modulus of the material.

There has been provided a MAX phase with abradable polymer based composite for turbine engine seals. While the MAX phase and polymer based abradable composite has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A turbine engine system comprising:
   a turbine engine fan section; said fan section including a fan casing and a fan blade rotatable within said fan casing;
   an abradable seal coupled to said fan casing between said fan casing and said fan blade, said abradable seal comprising an abradable composite layer formed by a MAX based solids reinforcement and a polymer based composition, wherein said abradable composite layer includes said MAX phase solids from 1% to 66% by volume and said polymer based abradable composition being the remainder.

2. The turbine engine system according to claim 1, wherein said MAX phase solids is a composite having MAX phases and a metal matrix.

3. The turbine engine system according to claim 2, wherein said MAX phase solids are defined by the formula $M_{n+1}AX_n$ where M is an early transition metal element, A is an A-group element, X is C or N, and n=1 to 3.

4. The turbine engine system according to claim 1, further comprising a coating layer deposited between said fan casing and said abradable seal.

5. The turbine engine system according to claim 1, wherein said abradable composite layer includes said MAX phase solids and a polymer based abradable material and a hollow micro sphere material.

6. A turbine engine abradable outer air seal comprising:
   a casing substrate;

an abradable composite layer coupled to said substrate; and said abradable composite layer formed by a MAX based solids reinforcement and a polymer based composition, wherein said abradable composite layer includes said MAX phase solids of between 1 wt. % and 10 wt. % and said polymer based abradable composition being from 90 wt. % to 99 wt. %.

7. The turbine engine abradable outer air seal according to claim 6 wherein said turbine engine abradable outer air seal comprises a fan abradable outer air seal.

8. The turbine engine abradable outer air seal according to claim 6, wherein said MAX phase solids include a composite having MAX phases and a metal matrix.

9. The turbine engine abradable outer air seal according to claim 8, wherein said MAX phase solids are defined by the formula $M_{n+1}AX_n$ where M is an early transition metal element, A is an A group element, X is carbon or nitrogen, and n=1 to 3.

10. The turbine engine abradable outer air seal according to claim 6, further comprising a bond coat coupled between said substrate and said abradable composite layer.

11. A process for manufacturing a turbine engine abradable outer air seal component, said process comprising the steps of:

forming an abradable composition formed of a MAX phase solids reinforcement and a polymer based composition;

mixing said MAX phase solids of between 1 wt. % and 10 wt. % and said polymer based abradable material from 90 wt. % to 99 wt. % into the abradable composition;

applying said abradable composition to a fan casing substrate in the form of an outer air seal.

12. The process of claim 11, further comprising:

coupling a bond coating to said substrate between said substrate and said abradable composition.

13. The process of claim 11, wherein said MAX phase solids comprise MAX phases and a metal matrix.

14. The process of claim 13, wherein said metal matrix is metal or metal alloy and said MAX phase solids are defined by the formula $M_{n+1}AX_n$ where M is an early transition metal element, A is an A group element, X is carbon or nitrogen, and n=1 to 3.

15. The process of claim 11 further comprising:

combining a filler with said MAX phase solids and said polymer based abradable material into said abradable composition.

* * * * *